(12) United States Patent
Van Erkel et al.

(10) Patent No.: US 8,241,482 B2
(45) Date of Patent: Aug. 14, 2012

(54) PROCESS FOR THE RECOVERY OF ACIDS

(75) Inventors: Joost Van Erkel, Apeldoorn (NL); Earl Lawrence Vincent Goetheer, Westdorpe (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 1243 days.

(21) Appl. No.: 11/667,653

(22) PCT Filed: Nov. 18, 2005

(86) PCT No.: PCT/NL2005/000801
§ 371 (c)(1),
(2), (4) Date: Oct. 18, 2007

(87) PCT Pub. No.: WO2006/054893
PCT Pub. Date: May 26, 2006

(65) Prior Publication Data
US 2008/0047838 A1    Feb. 28, 2008

(30) Foreign Application Priority Data
Nov. 18, 2004    (EP) .................................. 04078168

(51) Int. Cl.
*C25B 7/00*    (2006.01)
(52) U.S. Cl. ........ 205/352; 204/518; 204/539; 204/541; 205/440; 205/687; 205/703; 210/748.01

(58) Field of Classification Search .................. 205/352, 205/440, 687, 703; 204/518, 539, 541; 210/748.01
See application file for complete search history.

(56) References Cited

U.S. PATENT DOCUMENTS 3,771,654 A * 11/1973 Meissner ...................... 210/787
6,280,593 B1 * 8/2001 Wiese et al. .................. 204/538
6,551,803 B1 * 4/2003 Fischer et al. ................. 204/537

OTHER PUBLICATIONS

M. Jarvinen, L. Myllykoski, R. Keiski, J. Sohlo. "Separation of lactic acid from fermented broth by reactive extraction." Bioseparation. May 2000. Springer Netherlands. vol. 9, Issue 3. pp. 163-166.*
M. Hongo, Y. Nomura, M. Iwahara. "Novel method of lactic acid production by electrodialysis fermentation." Appled and Environmental Microbiology. Aug. 1986. vol. 52, Issue 2. pp. 314-319.*

* cited by examiner

*Primary Examiner* — Keith Hendricks
*Assistant Examiner* — Steven A. Friday
(74) *Attorney, Agent, or Firm* — Hoffmann & Baron, LLP

(57) ABSTRACT

The invention is directed to a process for recovering acids from mixtures containing them, in particular organic acids and amino acids, such as acids produced by fermentation in a fermentation broth. The process of the invention comprises contacting a loaded extractant with a solution containing hydroxide ions in the presence of at least one cathode and at least one anode, wherein said hydroxide ions are produced by using said cathode, whereby said acid is converted to its anionic form, by which it can be removed from said extractant and can migrate in the direction of the anode.

10 Claims, 1 Drawing Sheet

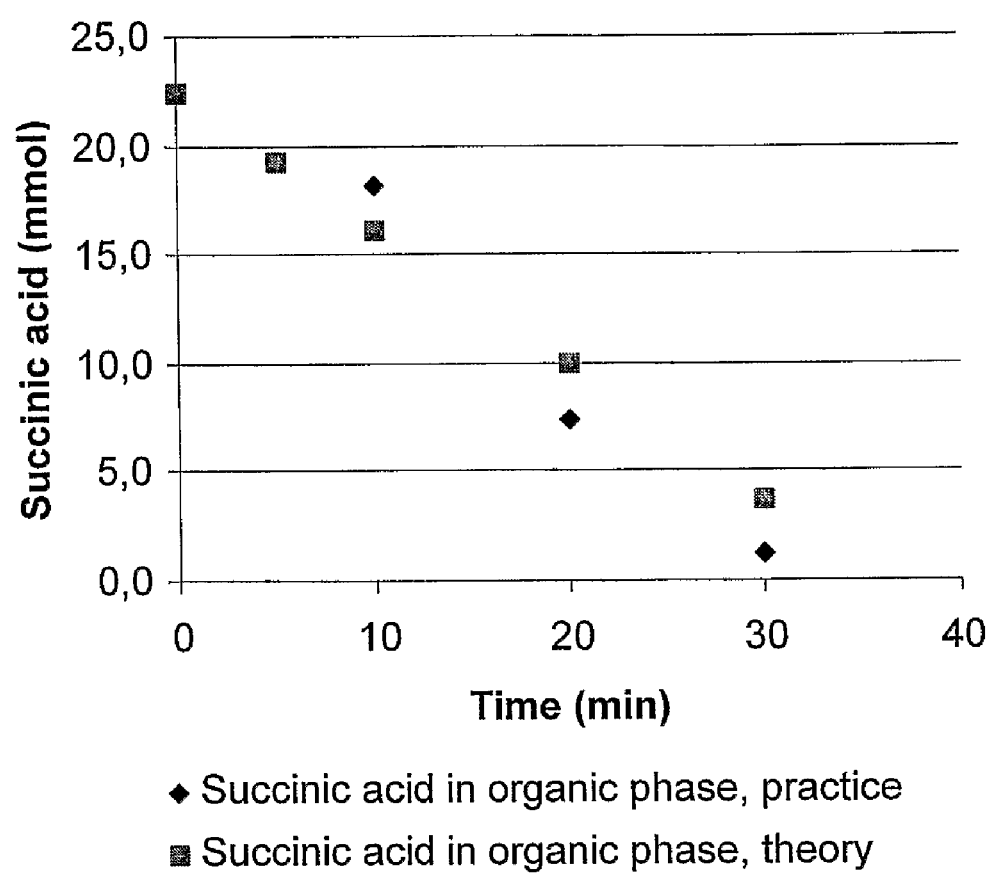

PROCESS FOR THE RECOVERY OF ACIDS

This application is the U.S. National Phase of, and Applicants claim priority from, International Application Number PCT/NL2005/000801 filed 18 Nov. 2005 and European Patent Application bearing Serial No. 04078168.4 filed 18 Nov. 2004, which are incorporated herein by reference.

BACKGROUND OF THE INVENTION

The invention is directed to a process for recovering acids from mixtures containing them, in particular organic acids, such as acids produced by fermentation in a fermentation broth.

Organic acids (viz. acids characterized by a carboxyl (—COOH) group), such as lactic acid, citric acid, succinic acid, cinnamic acid and amino acids, are useful base chemicals that may be produced by fermentation of organic material, in particular from material containing sugars, or compounds containing sugar groups, such as cellulose.

To recover the product, generally use is made of an extracting agent, in particular an organic extracting agent, such as tertiary or quaternary amines. By contacting the fermentation broth with the extractant, the product that is dissolved in the broth is transferred from the broth to the extractant, by which the product is concentrated in the extractant. Subsequently the product is removed from the extractant by extracting it back therefrom. In this way, further concentration of the product is obtained. In case the product is an organic acid, back extraction may e.g. be carried out by addition of an alkaline solution to the loaded extractant. As a result, the interaction between the extractant and the product is broken, and the anion of the acid is transferred to the alkaline solution phase. This method requires the continuous replenishing of the basic solution. Subsequently, an acid, in particular an inorganic acid, such as $H_2SO_4$, is added to the alkaline solution, which results in formation of the product acid so that the product acid can be obtained. An (inorganic) salt is obtained as a by product, which usually is disposed of as a waste.

The disadvantage of this process for back-extraction of acids from a fermentation broth or other type of mixture, is that a considerable stream of waste is produced in the form of a salt, such as gypsum. The present invention seeks to overcome this and other disadvantages.

SUMMARY OF THE INVENTION

It was found that by producing $OH^-$ and $H^+$ ions in situ, by employing electrodes, the feasibility of the recovery of the product acid from the extracting agent may be considerably increased and the above objective can be met.

Thus, in a first aspect, the present invention is directed to a process for recovering acids from a loaded extractant, said process comprising contacting said loaded extractant with a solution containing hydroxide ions in the presence of at least one cathode and at least one anode, wherein said hydroxide ions are produced by using said cathode, whereby said acid is converted to its anionic form, by which it can be removed from said extractant and can migrate in the direction of the anode.

The term "loaded extractant" means that the product is (reversibly) bonded (chemically, physically, or both) to the extractant. By subjecting the loaded extractant to suitable conditions, such as contacting with an alkaline solution, the product may be released therefrom, thus yielding fresh extractant, which can be reused.

U.S. Pat. No. B1-6,280,593, EP-A-0 201 925, WO-A-99/00178, U.S. Pat. No. 5,290,404, U.S. Pat. No. 2,967,806, GB-A-0 738 516, GB-A-0 600 182 and GB-A-1 033 030 describe processes comprising the conversion of salts into acids by electrochemical methods. The use of an extractant and the subsequent liberation of acid from the extractant in accordance with the present invention is not disclosed or suggested in these prior art documents. One of the advantages of the present invention over the prior art is that the use of an extractant facilitates subsequent concentration of the product in the form of a extractant/product complex, after which the product is separated from the extractant by electrochemical means. Because this electrochemical step can be carried out using solutions that have a high product concentration, the overall process efficiency is high.

DETAILED DESCRIPTION OF THE INVENTION

The chemical processes that take place in the process of the present invention may be illustrated by the following reactions that are given as an example.

First, an extract ant, such as for example $R_3N$, typically dissolved in an apolar (i.e. non-aqueous) solvent thus forming an organic phase, is contacted with an aqueous solution that contains the product acid, HA, so that a complex (loaded extractant) is formed:

$$(R_3N)_{org} + (HA)_{aq} \rightarrow (R_3NH^+A^-)_{org} \qquad (i)$$

The loaded extractant complex is typically dispersed in the aqueous fermentation broth, which may be previously filtrated, and can be easily separated therefrom, e.g. by allowing this emulsion to settle, so that a separate aqueous phase and apolar phase containing the product are obtained. This separation of the emulsion may be enhanced by centrifugal action. Subsequently, the loaded extractant is contacted with hydroxyl ions, that are produced on the cathode, thereby releasing the acid in its anionic form and yielding fresh extractant:

$$(OH^-)_{aq}(\text{ex cathode}) + (R_3NH^+A^-)_{org} \rightarrow (R_3N)_{org} + (A^-)_{aq} + (H_2O)_{aq} \qquad (ii)$$

Subsequently, the anion of the product acid is allowed to migrate through the solution surrounding the cathode, optionally passing a suitable separator and subsequently enters the surrounding of anode, which is acidic in nature. Because of the abundance of $H^+$ that is formed by the anode, the $A^-$ is allowed to form the acid:

$$H^+(\text{ex anode}) + A^- \rightarrow HA \qquad (iii)$$

Subsequently, the organic acid solution can be further concentrated, or can be recovered in its pure form from the solution, e.g., by precipitation.

The separator provides a barrier between the catholyte and the anolyte solutions, thus preventing their mixing, while allowing the organic anions to pass from the aqueous catholyte solution into the anolyte. The separator can be an anion exchange membrane, or can be made from a porous material, such as a ceramic material, glass frit, asbestos, porous (wetted) polyethylene, etc.

The electrodes should be made of material with electricity conducting properties. The cathode which has to withstand alkaline conditions, may be constructed from iron, stainless steel, nickel, platinum, or alloys containing these and other metals, or be made from carbon. The anode may be made from titanium coated with (mixtures of) precious metal oxides such as platinum, iridium and/or ruthenium, sometimes also referred to as dimension stable anodes (DSA), or from nickel, or nickel alloy materials, or from carbon.

Preferably the loaded extractant is formed by contacting an aqueous mixture containing said product acid, with said extractant, whereby said acid is transferred from said aqueous mixture to said extracting agent. The aqueous mixture is preferably a fermentation broth, wherein the product acids are present. Typically, the above-mentioned types of organic acids, as well as other types of commercially interesting organic acids, are present in fermentation reactors only in small concentrations, inter alia because of product inhibition on the formation of these products by the micro-organisms.

It is preferred to carry out the step of forming the loaded extractant (herein referred to as "step a)", corresponding to reaction (i) hereinabove) in a separate container from the container wherein the step of contacting said loaded extractant with said OH⁻ containing solution (herein referred to as "step b)", corresponding to reaction (ii) hereinabove) is carried out.

It is preferred that in step a) an emulsion of the loaded extractant in the OH⁻ containing solution is formed by mixing the extractant solution (the organic phase) and the fermentation broth (the aqueous phase). After some time an equilibrium is reached between the concentrations of the product in the organic and aqueous phases. Thereupon the phases may be separated, e.g. under the influence of gravity or by means of a centrifuge. If there is still product present in the aqueous phase, then this procedure can be repeated one or more times with fresh, or regenerated extractant. Of course this procedure could also be done in counter-current operations. The separated, loaded extractant is then fed into the catholyte compartment for recovery of both the product and the regenerated extractant (to be reused).

There are alternative ways for the preparation of the loaded extractant. One alternative is by using pertraction technology. With this technology the fermentation broth is contacted with the extractant in a membrane module. The membrane separates the extractant and fermentation solutions, thus omitting the need for the formation of an emulsion. It is preferred that in step b) the loaded extractant is mixed with an aqueous phase that may contain dissolved organic salt, and/or inorganic salt to further increase the conductivity of the mixture. The organic salt may come from the product produced in the fermentation process. Suitable inorganic salts are sodium sulphate, sodium perchlorate, etc. This mixture is produced or fed into the catholyte compartment of an electrolysis reactor.

Suitable extractants are those from the group of acidic and complexing extracting agents, for instance:
Anion exchangers, in particular liquid anion exchangers, of the types:
  Primary Amines
  Secondary amines, e.g., ADOGEN® 283
  Tertiary amines, e.g., tri-octylamine (commercially known as ALAMINE® 336), tri-ethylamine, and various ADOGEN® (Sherex Chemicals), particular ADOGEN® 364
  Quaternary amines, such as ALIQUAT® 336, or ADOGEN® 464
Acid extractants of the types:
  Carboxylic acids, e.g., naphtenic acids
  Alkyl phosphoric acids, e.g., di-2-(ethylhexyl)phosphoric acid (D2EHPA), di-2-(ethylhexyl)dithiophosphoric acid (DEHTPA), 2-ethylhexyl-phosphonic acid mono-2-ethylhexylester (HEHEHP), octylphenylphosphoric acid (OPPA), di-2-octyl-decanoic acid (e.g. obtainable as VERSATIC® 10), 1,5-nonyl-naphtalenesulphonic acid (e.g. obtainable as SYNEX™ 1050)
  Aryl sulfonic acids
Acid chelating extractants of the type:
  Hydroxyoximes
  Oxine derivatives
  β-diketones
  Alkarylsulfonamide
  Polyols Each of these extraction agents may be used, either alone or in combination. To decrease their viscosity, and/or specific gravity the (mixture of) extracting agent(s) may be diluted with an appropriate organic solvent, or a mixture of organic solvents. These solvents may be selected from the classes of aliphatic and aromatic hydrocarbons. Also a diluent modifier may be present from the class of solvating reagents such as nonyl phenol, isodecanol, or tributyl phosphate.

Apolar extracting agents are preferred in accordance with the present invention because they can form an emulsion with aqueous fermentation broths, which emulsions allow for relatively easy separation after the product has been extracted into the extractant.

The process of the present invention may be used to recover commercially relevant acids, in particular organic acids including amino acids, more in particular organic acids—particularly amino acids—formed in fermentation reactions. Preferably the product acid is selected from one or more of the following:
Amino acids:
  glutamic acid
  lysine
  phenylalanine
  combinations thereof
Other organic acids:
  citric acid
  lactic acid
  cinnamic acid
  hydroxycinnamic acid
  succinic acid
  adipic acid
  4-hydroxybenzoic acid
  combinations thereof The present invention will be illustrated by the following non-limiting example.

The applied conditions for the electric operation of the process of the present invention, in particular the voltage and current density applied across the cathode and anode may be chosen freely depending on the specific products and concentrations. Typically the applied voltage will be in the range of 1 to 50 V, more preferably 5-25V. Typical current densities are from 50 to 1 000 $A \cdot m^{-2}$, more preferably from 100 to 500 $A \cdot m^{-2}$.

The invention can be used to recover organic acid products from very diluted media, in particular fermentation broths. The concentration of the products typically ranges from 0.5 to 50 mmol, preferably 1 to 10 mmol, more preferably from 2 to 5 mmol.

EXAMPLE

An organic extractant was prepared by mixing 25 ml tri-octylamine (SIGMA® T8631) and 75 ml n-hexanole (ALDRICH® H1330-3) in a 400 ml beaker. To the organic extractant was added 75 ml of an aqueous 0.253 M succinic acid (SIGMA® S7501) solution as a model solution for a fermentation broth, and in 30 minutes an emulsion was allowed to form by mixing at 750 rpm. Subsequently, the emulsion was transferred into a separation funnel and was left to separate during 16 hours. After phase separation the volume of the organic phase was 77.5 ml. The succinic acid concentration in the aqueous phase was analyzed by potentiometric titration with 0.100 M KOH (TITRISOL®) solution.

The loaded organic phase thus prepared, was subsequently added to 75 ml of an aqueous 0.25 M disodium succinate (SIGMA® S2378) solution, and stirred at 750 rpm for 30 minutes. After this period, a 5 ml sample was taken for potentiometric analysis, and the emulsion thus prepared was used as the catholyte in the experiment that was started at that time. The anolyte was an aqueous solution of 0.25 M disodium succinate (SIGMA® S2378). The catholyte was pumped with a peristaltic pump from its storage vessel through the catholyte compartment of the electrochemical reactor at a flow velocity of 900 ml/minute. And the anolyte was pumped with another peristaltic pump through the anolyte compartment of the same electrochemical reactor at a flow velocity of 900 ml/minute.

The electrochemical reactor was made from PVDF and was equipped with two platinum gauze electrodes (electrode length 10.0 cm, electrode width 2.0 cm). The dimensions of the cathode and anode compartments were: length 12 cm, width 2 cm, depth 0.5 cm. The anolyte and catholyte compartments were separated from each other by an anion selective membrane (type: FUMATECH® FAS). The electrolysis was performed at a constant current of 2.0 Ampere provided by a DC current supply (DELTA ELEKTRONIKA® Power Supply E060-6). Samples taken from anolyte and catholyte were analysed by potentiometric titration with 0.100 M KOH (TITRISOL®) and 0.100 M HCl (TITRISOL®). Only the aqueous portions of the samples from the catholyte were analysed. The concentrations of the organic phase were calculated from the concentrations analysed in the aqueous solutions. Table 1 shows the experimental results.

TABLE 1

Distribution of succinic acid and succinate over the various solutions during electrolysis at 2 A.

| | Time (minutes) | | | |
|---|---|---|---|---|
| | 0 | 10 | 20 | 30 |
| pH in anolyte | 7.4 | 7 | 6 | 6 |
| pH in catholyte | 5.8 | 6 | 6 | 8 |
| Succinic acid in anolyte (mmol) | 34.8 | 40.9 | 48.7 | 55.7 |
| Succinic acid in aqueous phase of catholyte (mmol) | 18.1 | 16.2 | 19.1 | 18.2 |
| Succinic acid in organic phase (mmol) | 22.4 | 18.1 | 7.4 | 1.3 |

FIG. 1 shows the decrease of succinic acid in the organic phase during electrolysis. From this figure it follows that the decrease of the succinic acid content of the organic phase as a function of the electrolysis time is in close agreement with the theoretical line. The theoretical line indicated in FIG. 1, represents the reaction of two hydroxide ions produced through electrolysis with each succinic acid molecule present in the organic phase. From this example it follows that the succinate liberated from the organic phase is transferred through the membrane into the anolyte. After 30 minutes of electrolysis ca. 90% of the organic phase is regenerated.

The invention claimed is:

1. A process for recovering one or more organic acids from an aqueous mixture, comprising the steps of:
    contacting an extractant with an aqueous mixture containing one or more organic acids, thus forming an extractant that is loaded with one or more organic acids;
    contacting said loaded extractant with a solution, wherein said loaded extractant and said solution are in contact with at least one cathode and at least one anode;
    applying an electrical current to said at least one cathode and said at least one anode, wherein hydroxide ions are produced by using said cathode, whereby said one or more organic acids is/are converted to its/their anionic form(s), separate(s) from the extractant, and migrate(s) in the direction of the anode; and
    removing said anionic form(s) of said one or more organic acid(s).

2. The process according to claim 1, wherein said aqueous mixture is a fermentation broth.

3. The process according to claim 1, wherein the step of forming said loaded extractant is carried out in a separate container from the container wherein the step of contacting said loaded extractant with said solution is carried out.

4. The process according to claim 3, wherein an emulsion of said loaded extractant is formed when the extract contacts the aqueous mixture.

5. The process according to claim 4, wherein said emulsion is separated by using a centrifuge or gravity.

6. The process according to claim 1, wherein said extractant is selected from the group consisting of anion exchangers, acid extractants, acid chelating extractants, and combinations thereof.

7. The process according to claim 1, wherein said one or more organic is/are selected from the group consisting of amino acid, citric acid, lactic acid, cinnamic acid, hydroxycinnamic acid, succinic acid, adipic acid, 4-hydroxybenzoic acid, and combinations thereof.

8. The process according to claim 7, wherein said amino acid is selected from the group consisting of glutamic acid; lysine; phenylalanine; and combinations thereof.

9. The process according to claim 1, wherein the concentration of said one or more organic acid(s) in said aqueous mixture is from 0.5 to 50 mmol.

10. The process according to claim 1, wherein the concentration of said one or more organic acid(s) in said aqueous mixture is from 1 to 10 mmol.

* * * * *